March 8, 1927. 1,620,205
H. HERMANI
SHEET METAL ASSEMBLING AND WORKING MACHINE
Filed May 26, 1926 7 Sheets-Sheet 1

INVENTOR
Henry Hermani
BY
J. Granville Meyers
ATTORNEY

March 8, 1927.

H. HERMANI 1,620,205

SHEET METAL ASSEMBLING AND WORKING MACHINE

Filed May 26, 1926 7 Sheets-Sheet 2

INVENTOR
Henry Hermani
BY
J. Granville Meyers
ATTORNEY

March 8, 1927.

H. HERMANI 1,620,205

SHEET METAL ASSEMBLING AND WORKING MACHINE

Filed May 26, 1926　　7 Sheets-Sheet 3

INVENTOR
*Henry Hermani*
BY
*J. Granville Meyer*
ATTORNEY

March 8, 1927.

H. HERMANI

1,620,205

SHEET METAL ASSEMBLING AND WORKING MACHINE

Filed May 26, 1926 7 Sheets-Sheet 6

INVENTOR
Henry Hermani
BY
J. Granville Meyers
ATTORNEY

Patented Mar. 8, 1927.

1,620,205

UNITED STATES PATENT OFFICE.

HENRY HERMANI, OF BALTIMORE, MARYLAND, ASSIGNOR TO THE TIN DECORATING COMPANY OF BALTIMORE, OF BALTIMORE, MARYLAND, A CORPORATON OF NEW JERSEY.

SHEET-METAL ASSEMBLING AND WORKING MACHINE.

Application filed May 26, 1926. Serial No. 111,699.

My invention relates to machines for assembling and otherwise operating on sheet-metal parts, and in the particular embodiment here illustrated is especially designed for assembling the bodies and collars of sheet-metal cans of the rip-strip type; but in its broader aspects the utility of the invention is not limited, and it may be adapted, with or without modification, for other sheet-metal assembling and working operations.

The general object is to facilitate and greatly increase the rapidity of operations in assembling and securing together sheet metal parts, and especially in the present preferred embodiment, to rapidly and economically insert the short cylindrical sheet-metal necks or collars in the bodies or round cans of the type above mentioned.

To this end the machine comprises, in the present embodiment, means for initially supplying or feeding the can bodies and collars and bringing them into approximate assembly positions; means for inserting the collars successively in the respective can bodies, and means for then performing clinching or crimping operations to secure the collars in position, after which the cans are discharged for any convenient disposal. Preferably, as here shown, the operations of the machine are entirely automatic and include, in the present preferred form, provision for a substantial travel of the collared cans from the assembly or inserting means to the clinching or securing means, this provision or mechanism being referred to herein in some cases as a "storage run"; but this feature is not essential in all cases, and the machine may be so arranged that collared cans are transferred practically directly from the inserting means to the securing means.

The characteristics and advantages of the invention are further sufficiently explained in connection with the following detail description of the accompanying drawings, which show one representative embodiment. After considering this example, skilled persons will understand that many variations may be made, and I contemplate the employment of any structures that are properly within the scope of the appended claims.

In the drawings:

Fig. 11 is a sectional detail in reduced scale in the plane 11—11, Fig. 10.

Fig. 12 is a section of Fig. 11 in the plane 12—12.

Figures 16, 17, 18:
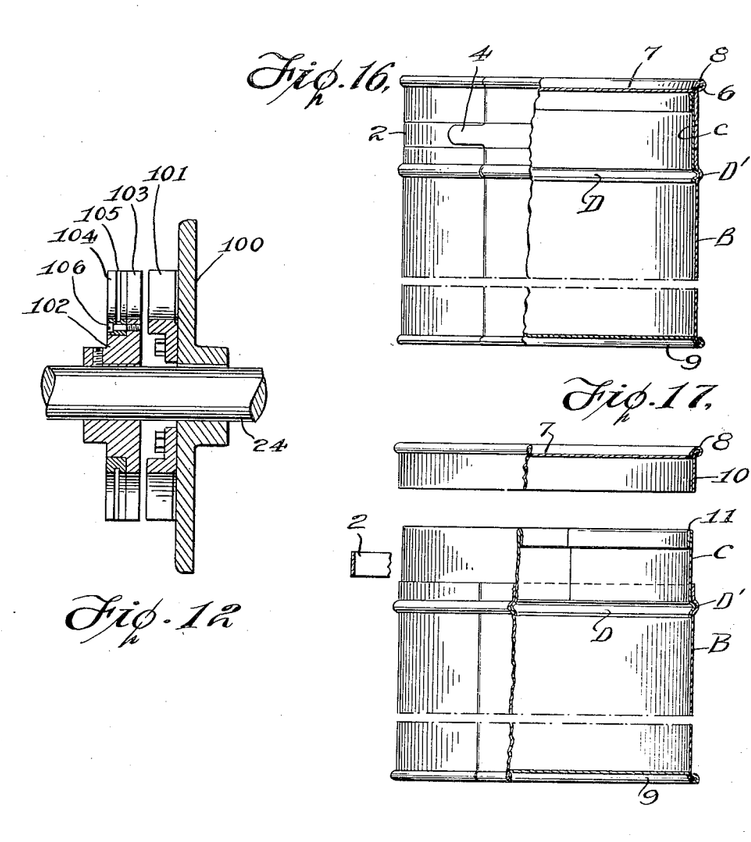
Fig. 16 shows a can of the type for which this machine is designed, completed, that is closed and sealed after filling and vacuum treatment.
Fig. 17 shows the same can after opening by the consumer by removal of the rip-strip.
Figure 19:
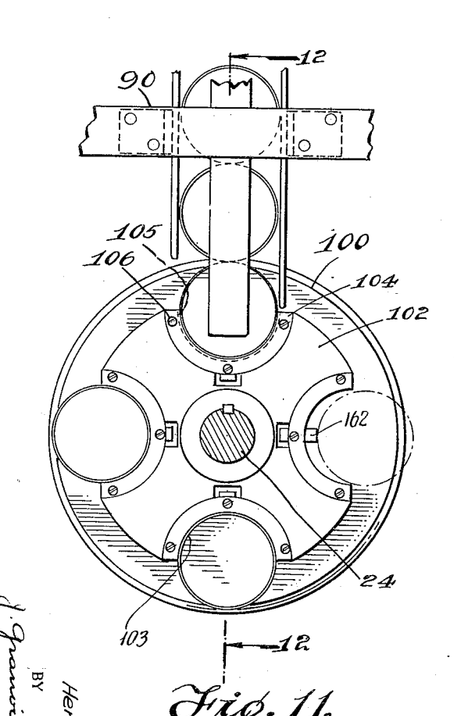

The machine here represented as an embodiment of the invention, is designed for inserting collars C, Figs. 5, 11, 12 and 13, in cylindrical can bodies B, and securing the collars in position by the formation, simultaneously, in the collar and body, of interfitting outwardly convex creases or beads D, D'. These cans are intended particularly for packing commodities (with or without vacuum treatment), and to facilitate the opening of the completed can shown in Fig. 9, the body is provided near one end, usually on its inner surface, with parallel single or double score lines 1 defining the rip-strip 2 which is to be produced by tearing away the strip of metal between the score line. For this purpose the body sheet has an integral tongue 4 alined with the rip-strip, extending from the side seam 5. To open the can a slotted key (not shown) is applied to the tongue and the key is revolved to wind upon it the tongue and the rip-strip. In order to provide a removable flanged cover to properly protect the can contents after it is initially opened by removal of the rip-strip, in the process of manufacture a cylindrical collar C of sheet metal is inserted in one end of the body, underlying the rip-strip and with its outward end nearly flush with the slightly-flared body lip 6, this flare being to facilitate the application of the top end-cap 7. The collar is secured by forming the matching beads D and D' above mentioned, the bead D being formed in the collar substantially at its inward margin, and the bead D' in the body being located slightly below the lower rip-score. Usually in the process of can manufacture the top can 7 is applied and secured to the body by a spun lock seam 8, as sufficiently understood in Figures 16 and 17, the central web of the cap then lying nearly or directly upon the outer edge of the collar C. Usually the top or bottom end-cap is left off, and the can is shipped in this condition to the commodity-packer, who fills the can, subjects it to vacuum treatment when that is desired, and while the vacuum is maintained, applies and lock seams the end cap in position, as sufficiently explained in Fig. 16, which shows the completed, vacuumized and hermetically sealed can, the contents being omitted for the sake of illustrative convenience. The commodity consumer opens the can by removing the rip-strip in the manner above explained, thus effecting separation between the removable top structure produced in the act of strip removal, this top structure consisting of the top cap 7 secured by the lock seam 8 to the upper margin 10 of the can body, which has now been separated from the main body B. The movable top structure or cover is shown in Fig. 17 removed from the can so that the can contents is accessible, and thereafter it may be reapplied to protect the contents by telescoping the flange 10 over the outer part of the collar C which now projects from the open end of the body B. In this way provision is made for a a readily-detachable, flanged cover, usable as such after the rip-strip is removed. In the present example, to avoid a raw, thin edge at the outer end of the collar, and also to reenforce the collar, the outward margin 11 is turned in flat, in the process of manufacturing the collar, producing a rounded outer edge 11 (Fig. 17) consisting of the doubled sheet material.

Figures 5, 9:
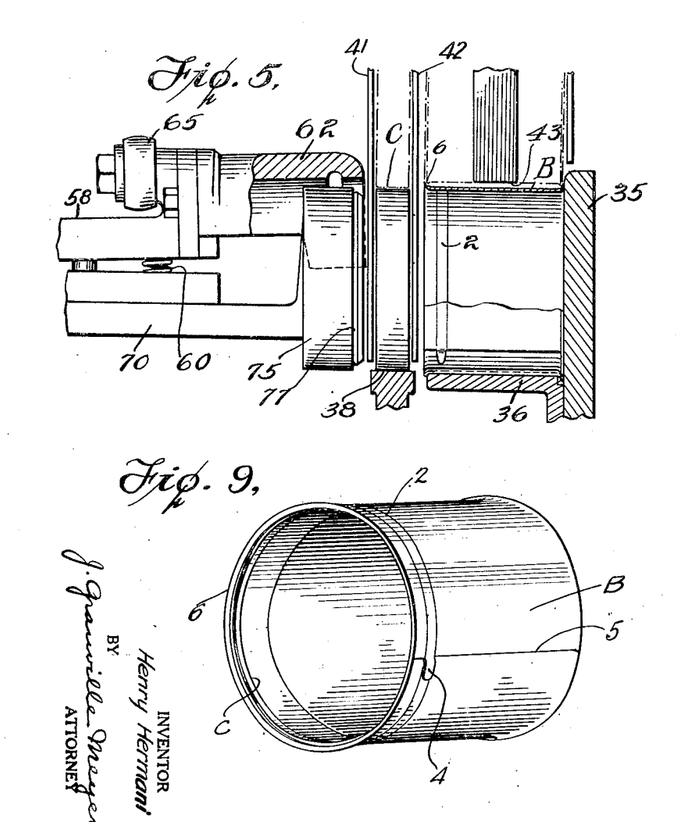
Fig. 5 is a fragmentary positional view, enlarged, of the collar and can body feeding and supporting means and inserting means of the inserting mechanism I.
Fig. 9 shows a can body with the inserted collar, as assembled in and discharged from the inserting mechanism.

The bodies are usually supplied to the machine in the condition shown in Fig. 5, that is, with both ends open and with the rip-strip and tongue formations completed. The machines could as well handle the bodies with the bottom end caps 9 (Figs. 16 and 17) in place, but they are usually not applied before the present assembly operations. The collars are supplied to the machine in the condition shown in Fig. 5, that is, in final form, except for the formation of the retaining bead.

Figure 7:
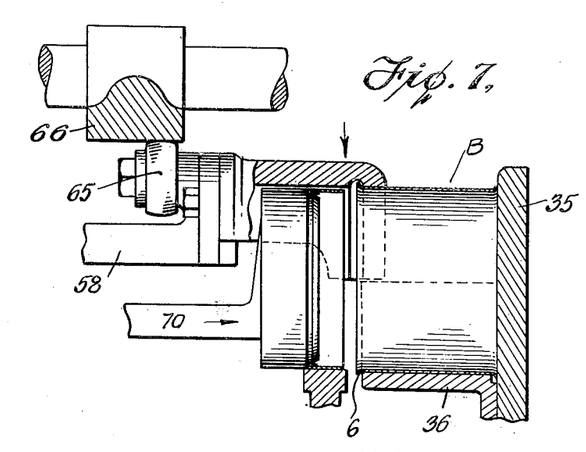
Figs. 7 and 8 are positional views, similar to Fig. 5, showing successive positions of the inserting mechanism and the position illustrated in Fig. 6.

The general plan of operations is such that the bodies and collars are advanced in chutes, with their cylindrical axes in parallel relations; one body and one collar, in axial alignment, substantially as shown in Fig. 5, are thus brought to the inserting mechanism which inserts the collar (which has a close sliding fit) into the top end of the can with its outward edge nearly in alinement with or slightly inward from the top edge or lip of the body, as shown in Fig. 7. Preferably, the can and body are advanced continuously, and preferably in a circuitous course, during the inserting operations, and a fresh body and collar are positioned and supplied to the inserting mechanism as soon as the ones first mentioned are moved away from the supply point. After insertion is completed, the bodies with the inserted collars are moved in rapid succession to the securing mechanism which conveniently operates on a plan generally similar to that of the inserting mechanism; that is, it operates, preferably, continuously, without station stops, and moves the bodies with inserted collars in a generally circuitous course while the interfitting beads are formed to lock the collars in position; and then the cans, completed so far as the present objects are concerned, are discharged for any convenient disposal. Usually they are conveyed to other mechanism which applies and secures the top caps 7, as shown in Fig. 16.

Figure 1:
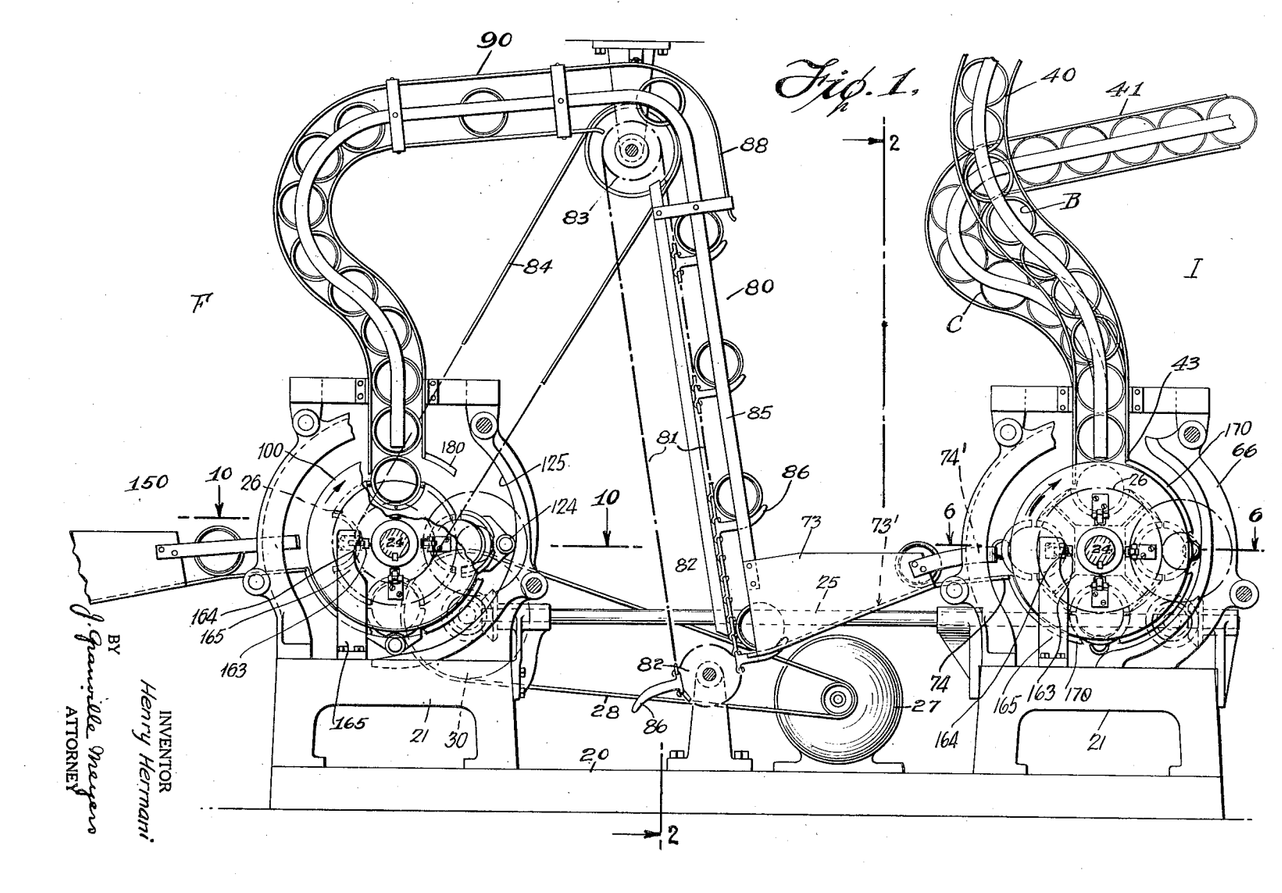
Fig. 1 is a side elevation of a machine embodying the invention in one form.

Although structural features or general arrangement of parts may vary considerably, the mechanism is usually constructed upon or about a base 20, Fig. 1, which supports the inserting mechanism I and the fastening mechanism F in proper relation.

The inserting and fastening mechanisms may conveniently, as here shown, be substantially similar in general construction and operation. Each of them includes a sub-base 21 connected to the main base 20, and pedestals 22 and 23 on the sub-base supporting bearings in which a main shaft 24 is mounted. Each main shaft supports a mechanism similar to a turret, which has a plurality of inner semi-cylindrical sockets or holders for the parts to be operated upon, and aligned with each inner holder an axially movable slide carries a semi-cylindrical clamp or outer holding member, and corresponding to each inner socket (or pair of aligned sockets) and clamping member, a plunger for collar inserting or bead forming operations. The head and plunger members are controlled by cams or similar devices which act during rotation of the turret to advance the slide, bring the outer holder or clamping socket member into clamping position, and thereafter to properly advance the plunger between the inner and outer holder members. In the case of the inserting mechanism, a cam body and collar are fed simultaneously to the uppermost aligned inner holders or sockets; as the turret moves away from the feed position the corresponding slide advances, bringing the outer clamping member into position to retain the can body in its inner holder or socket; the clamping member then moves to clamping position to definitely hold the can and loosely retain the collar in its inner holder or pocket; the plunger then advances to engage the collar and move it properly into the can; this insertion is completed when the turret has made about one-half rotation from the feed position, and in the next one-quarter rotation the plunger and outer clamping member are withdrawn, and the can with inserted collar is discharged and fed to the fastening mechanism F. In this mechanism the inner sockets or holding members are devised only to receive the can bodies with their inserted collars; in movement of the turret away from feed position the corresponding slide advances to bring a clamping member over the outer peripheral part of the can; the clamping member is then moved inward to definitely clamp the can and provide die abutments or outer, female die formations (the inner holders or pockets also having similar die formations); meantime the plunger, which in this case is in the form of an expansible die, is advanced within the can and collar, and when the turret has made nearly one-half rotation from the feed point, the die is expanded to produce the registering beads in the collar and body, as previously explained; in the next one-quarter turn of the turret, the plunger is withdrawn, the clamp is outwardly retracted and withdrawn axially, and the can, completed, so far as present purposes are concerned, is ejected; when the can pocket or holder in question completes the remaining quarter turn it receives another collared can, and the cycle is repeated.

Any convenient multiplicity of holders and corresponding parts may be provided in either of the turrets, but it is convenient to have the same number of pockets and other elements in each of the mechanisms, and it is also convenient to provide four of these instrumentalities or turret sections. Since each pocket receives a can and collar in the one case, or a collared can in the other case, at the beginning of its cycle of operations, this cycle being completed in one turn of the turret, as above explained, the different instrumentalities of each turret are continuously operating in regular sequence, and by the described plan of construction and operation, the turret may move continuously and at relatively high speed, and will assemble and fasten the collars in the can bodies on a very high and economical output basis.

Figures 3, 15:
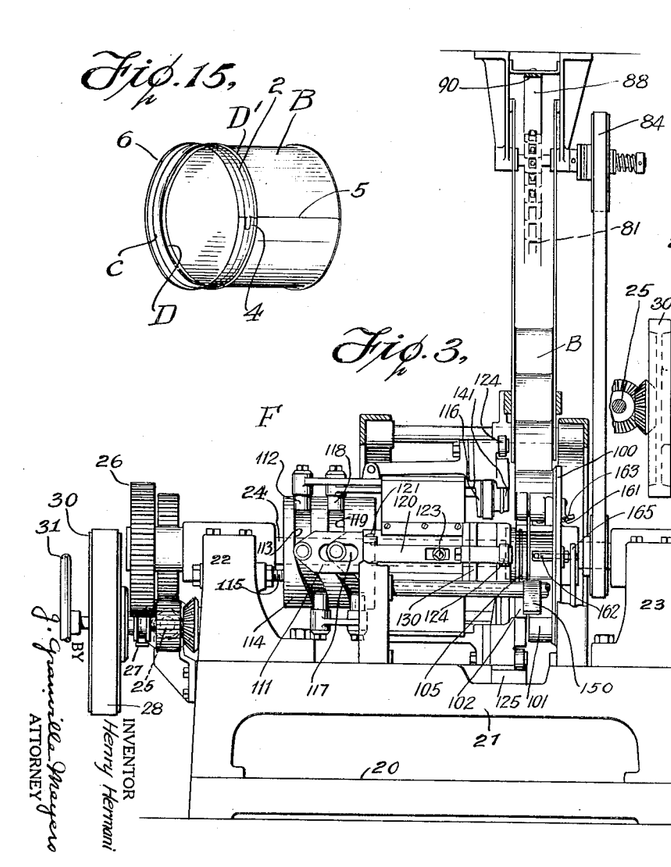
Fig. 3 is a left-hand elevation of Fig. 1, showing mainly the beading or clinching mechanism and its supply chute.
Fig. 15 is a perspective view of the cam as completed in and discharged from the fastening or beading mechanism.

The driving mechanism or connections may vary, but in the present example, each of the main shafts 24 is driven by a common countershaft 25 through reduction gearing 26, including a clutch 27 to permit either of the mechanisms I or F to be stopped independently of the other when this is necessary or desirable, as explained hereafter. The common countershaft is driven by a motor 27 mounted on base 20, a belt 28 and pulley 30 connected in the line of reduction gearing for the mechanism F. This gearing may also have a handwheel 31, Fig. 3, by which either or both of the mechanism I and F may be turned over slowly by hand for adjustment or inspection.

Figures 2, 4:
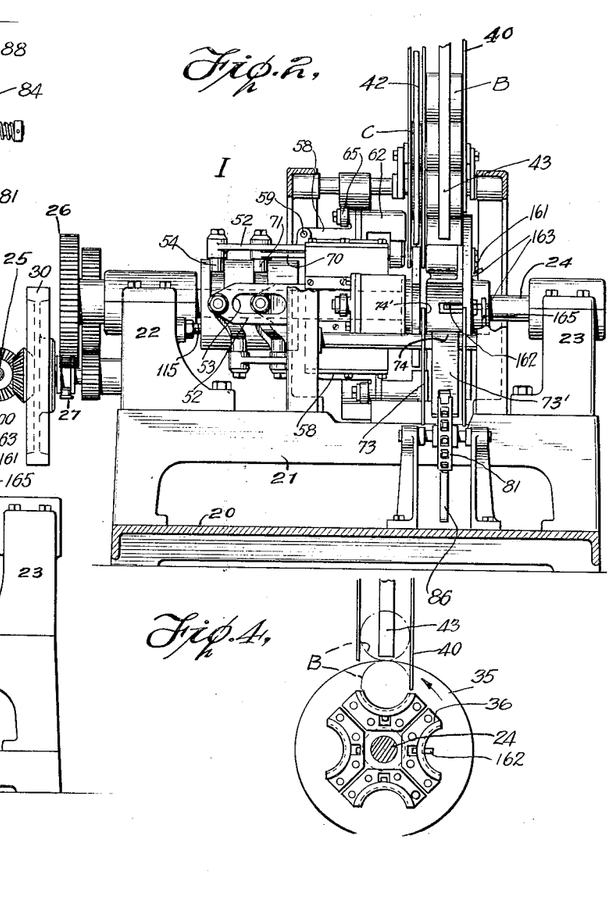
Fig. 2 is a vertical section at 2—2, Fig. 1, showing mainly the assembling or inserting mechanism, and supply chutes.
Fig. 4 is a fragmentary detail in the plane 4—4, Fig. 6.
Figure 6:
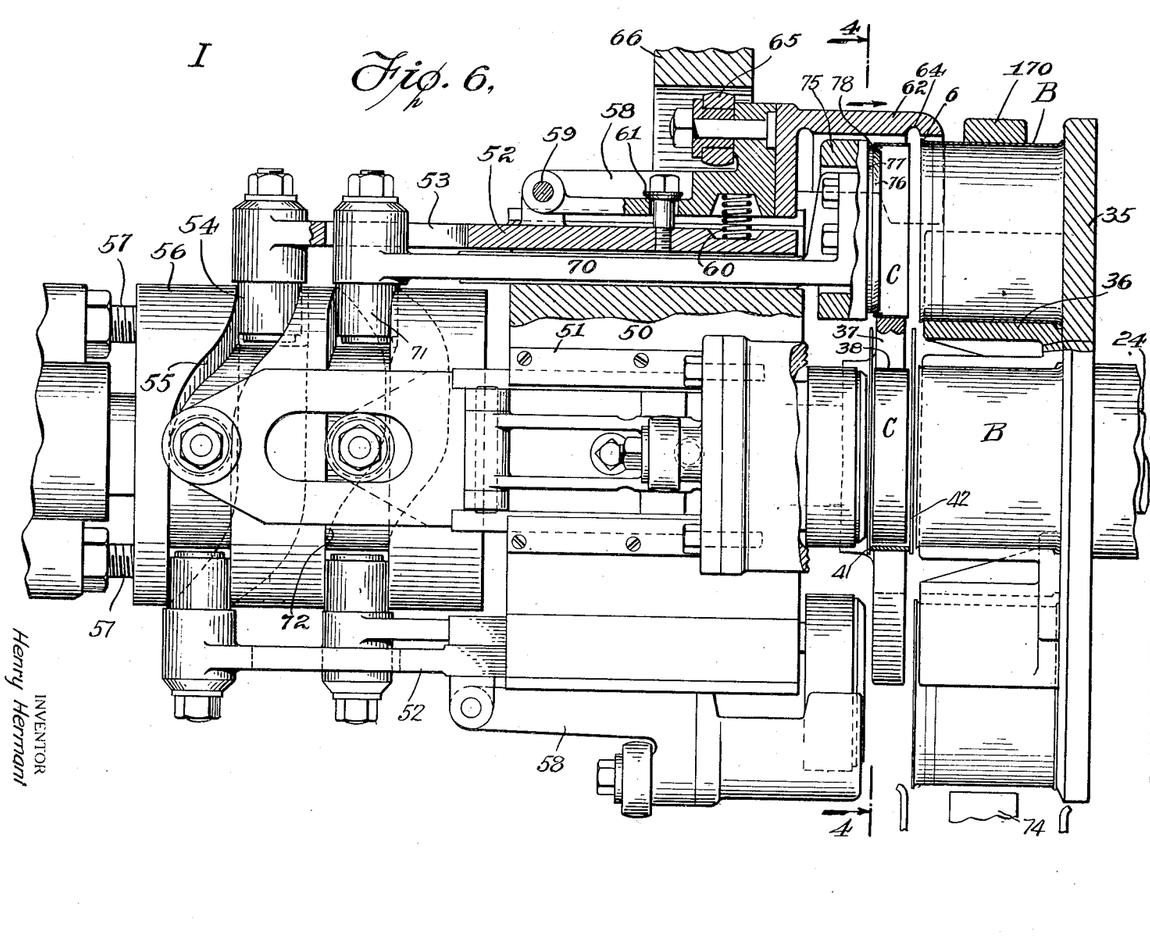
Fig. 6 is a section, enlarged, in the plane 6—6, Fig. 1, of the inserting mechanism.

Shaft 24 of the inserting mechanism I, Fig. 6, carries a disc 35 to which the inner can holders or sockets 36, of semi-cylindrical form, are secured in regularly spaced relation about the shaft axis. Adjacent the open ends of these sockets the shaft also carries a disc 37 provided with regularly spaced, semi-cylindrical sockets 38 (Fig. 4) for the collars C. A chute 40, Figs. 1 and 2, is provided through which a column of the can bodies B is fed by gravity with their axes parallel. A parallel chute 41 is provided for the gravity feed of a column of collars C in similar arrangement. These chutes are formed of side and end strips to properly guide the bodies and collars and at the same time permit inspection as they move through the chutes from any convenient source of supply. As the chutes approach the discharge point directly above shaft 24 of the inserting mechanism, Figs. 1 and 2, they run directly side by side and are separated from each other by the intermediate strip 42 which properly spaces an aligned can body and collar from each other as they approach the discharge ends of the chutes. As the respective pockets 36 and 38 rotate in the continuous revolution of the turret, before a pair of aligned sockets reaches top position, Figs. 1 or 4, the lowermost can body and collar in the respective chutes rest on circular segments intermediate the sockets 36 and 38 respectively, and then when the sockets reach uppermost position the body and collar fall into the respective sockets and are immediately carried onward by turret rotation, the chute strips being cut away at 43, Fig. 1, to permit egress of the body and collar. The next body and collar in the respective columns then immediately drop down upon the next circular segments of the rotating socket discs, ready to enter the next succeeding sockets, and so on. The socket disc 37 may be adjustably secured on shaft 24 to properly position collars in relation to can bodies of different lengths.

Shaft 24 also carries a turret body 50 provided with guides 51 to support four slides 52 corresponding to the respective pairs of aligned sockets 36 and 38, for reciprocation axially of the turret. Each slide has an arm 53 provided with a cam follower 54 engaging in the cam track 55 of the cam body 56 mounted on shaft 24, and prevented from rotation by connection to any convenient fixed frame part, as for example, by bolt 57. An arm 58 is pivotally connected at 59 to the outer part of each slide, and is urged outward by a spring 60 against an adjustable stop 61. At its free end this arm carries an outer, approximately semicylindrical socket of clamping member 62 to co-operate with one of the alined pairs of inner sockets or holders 36 and 38. Near its open end this clamping member has on its inner surface a channel 64 to accommodate the outer segment of the flared can body lip 6 above referred to. Arm 58 has a cam roll 65 co-operating with the inner face of an arcuate cam 66, Figs. 1 and 6. This cam may be adjustable, but in the operation of the machine is in fixed position, and is contoured to co-operate with the cam roll 65 and move the clamping holder 62 to clamping position, as hereafter described.

Corresponding to each of the slides is a bar 70 mounted for axial reciprocation in relation to the body 52 and the slide and provided with a cam follower 71 running in a cam track 72, which may be formed in the same cam body 56 that carries the track 55; or otherwise for convenience of manufacture or adjustment, the cam channels may be formed in separate bodies, each of which is locked against rotation. At the inward end of each bar 70 is a head 75, on the inner face of which is a shallow plunger, consisting of a tapered end 76, and a shallow cylindrical portion 77 surrounded by a shoulder 78.

Figure 8:
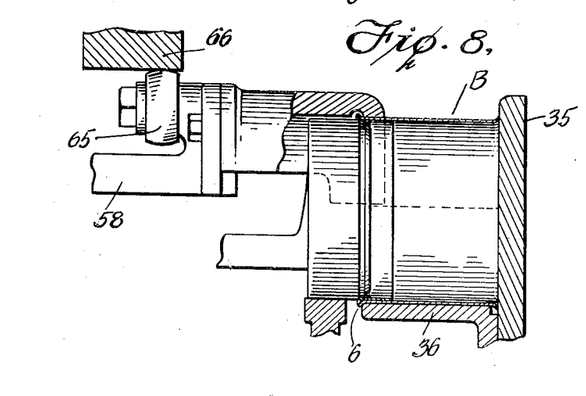

Fig. 5 shows two aligned sockets 36 and 38 in uppermost position, directly above the axis of the shaft (not shown in this figure). The can body B and collar C have just dropped into the respective sockets. The slide 52 with its outer clamping socket 62 are in retracted position as also is the plunger 75, so that movement of the can parts into their sockets was not obstructed. As the continuously revolving turret moves on in the direction indicated by the arrow, Fig. 1, the aligned and spaced body and collar are carried away from the feed chutes, and early in this movement cam roll 54 running in the channel 55 causes slide 52 to advance while the bar 70 with its plunger remain in retracted position, and at about the time the sockets and related devices approach the right hand horizontal position, as viewed in Fig. 1, the open end portion of the clamping socket 62 is brought over the end of the can body, while this clamping member is still in its outward position. After the clamping member moves slightly farther inward from the position shown in Fig. 6, channel 64 is opposite the outer segment of the flared body lip 6, and then about the time the parts reach the right hand horizontal position, cam roll 65 is moved inward toward the shaft axis by the properly contoured surface of cam 66, bringing the clamping member into clamping engagement with the can to hold the latter firmly in the inner socket. At about this time in the continued rotation of the turret, cam roll 71 moving in channel 72 causes bar 70 to move inward (toward the right in Fig. 6). The inner tapered part 76 of the plunger thereupon enters the outward end of the collar C and in the continued advance of the plunger, the collar is moved toward and into the can body in which it has a close sliding fit. The frictional resistance of this movement causes the cylindrical part of the plunger 77 to enter the end of the ring, and the edge of the ring finally encounters the shoulder 78 and is then positively moved by the plunger to final position within the body, as shown in Fig. 8. The described parts are then substantially in lower vertical position, or directly below the shaft axis. In continued rotation of the turret, the plunger is withdrawn, cam roll 65 or arm 58 passes away from cam 66; clamping member 62 is withdrawn outward by its spring 60, the stop 61 limiting the outward movement; cam roll 54 moving in channel 55 then withdraws the slide 52, and finally the plunger and clamping member are withdrawn to the left, as shown in Fig. 5, as the stated parts again reach upper vertical position, ready for the sockets to receive another aligned cam body and collar, and the cycle of operations is repeated indefinitely without turret pause and without any wear and tear on the mechanism, which would be necessitated by stopping and starting the turret or analogous part at stationary working positions. The machine therefore operates very rapidly and smoothly and effects the assembling of a very large number of bodies and collars per hour. Since each turret mechanism includes a plurality of sockets and corresponding parts, a corresponding plurality of operative cycles are in progress simultaneously.

As stated above, the inserting mechanism may be arranged to discharge cans directly or practically directly to the fastening mechanism and in such cases the mechanism I may be placed above the mechanism F and the cans discharged from the pockets of the first mechanism may then pass through a short chute directly to the receiving pockets of the second mechanism F. It is, however, desirable in some cases, as here shown, to provide a storage run of collared cans between the two mechanisms, this run being represented by the various chutes and conveyors SR intermediate the mechanism I and F. Such a storage run of substantial length, provides for a continuous series of collared cans moving from one mechanism to the other, and in case it is desired to stop the inserting mechanism, as for example if a defective can or collar causes a faulty action of the machine, requiring removal of the defective parts, the mechanism I may be stopped by throwing out its clutch without necessitating stoppage of the mechanism F. A supply of collared cans may be maintained so that one or more of these may be placed in the storage run to provide for continuous operation of the mechanism F while the mechanism I is temporarily stopped for the reasons explained or for other reasons.

The storage run or conveying system in the present example is composed as follows: A receiving chute 73 is provided for the collared cans discharged from the pockets of the inserting mechanism. This includes a downwardly tilted bottom plate 73¹ with side guide plates 73². The bottom plate 71 is continued at 74 to receive the cans as they roll from the pockets at left horizontal position, Fig. 1, and plate side strips 74' are also provided to properly receive and direct the cans to the chute. In some cases the cans will properly roll from the pockets into the chutes by gravity, but to insure their proper discharge, ejecting mechanism may be provided, this being similar to or identical with ejecting devices of the fastening mechanism F, and fully described below. From the lower end of chute 73 the cans are received and elevated in spaced relation by an elevating conveyor 80, consisting of a chain 81 running on sprockets 82 and 83. This conveyor may be driven by a belt 84 from a pulley on shaft 24 of the fastening mechanism F. Adjacent the chain are side strips 85 to properly guide the collared cans, and the chain is provided with curved, spaced, blades 86 moving through slots in the lower end of plate 73' to engage and elevate the cans. Near the top of the vertical conveyor 70 the cans pass inside of a guide strip 88 which forms the entrance to a chute 90 of generally similar construction to the chute 40 previously described. Through this chute the cans pass in a column, in contact with each other, by gravity, to the discharge end, where they are delivered to the pockets of the turret of the fastening mechanism.

The fastening mechanism turret structure includes a disk 100 secured to shaft 24. This disk is provided on its inward face with uniformly spaced semi-cylindrical sockets 101. Adjacent these sockets another disk 102 is adjustably secured, the adjustment being for the purpose of properly positioning die members carried by the disk for cans of different lengths, and also to provide proper supports for the inward ends of cans of different lengths. The disk 102 is provided with semicylindrical sockets 103 alined with sockets 101. In each of the sockets a die segment 104 is inserted, having formed therein a female bead-forming die recess 105. These die segments are detachably secured, as by screws 106, for convenient replacement.

On the shaft also is a turret body 110 having a plurality of slides 111 generally corresponding to the slides 52 of the inserting mechanism. Each of the slides has a cam roller 112, engaging a cam channel 113 of a cam body 114, secured against rotation by suitable means, such as bolt 115 extending from a fixed frame member. Each slide at its inward end has a male die head 116 carrying expansible die, as hereafter described. For each slide there is also a reciprocating bar 117 corresponding generally to bar 70 of the inserting mechanism and operated in substantially the same way by a cam roller 118 moving in a cam channel 119 of cam body 114. The bar 117 in the present case, however, is utilized to effect the expansion and retraction of movable dies, as also explained hereafter.

Each slide 111 also has an arm 120 pivotally connected at 121 and urged outward by springs 122 against an adjustable stop 123. The arm is provided with a cam roller 124 co-operating with an arcuate fixed cam 125. On the inward end of each of the arms is provided a substantially semi-cylindrical clamping and die socket 130 in which is inserted and detachably secured a die segment 131 having a female die channel 132 to complete the circle female die formation including the die channels 105 in sockets 103 above mentioned.

The die head 116 has four radial guide ways 140, in which expansible die carriers 141 are mounted for radial movement. Bar 117 above mentioned is connected to an inner toggle head 142 having sockets to receive the inner ends of toggles 143, the outer ends of which rest in sockets 144 in the die carriers. Each die carrier or die mounted thereon has on its outer periphery a segmental male die or bead formation 145.

Figure 13:
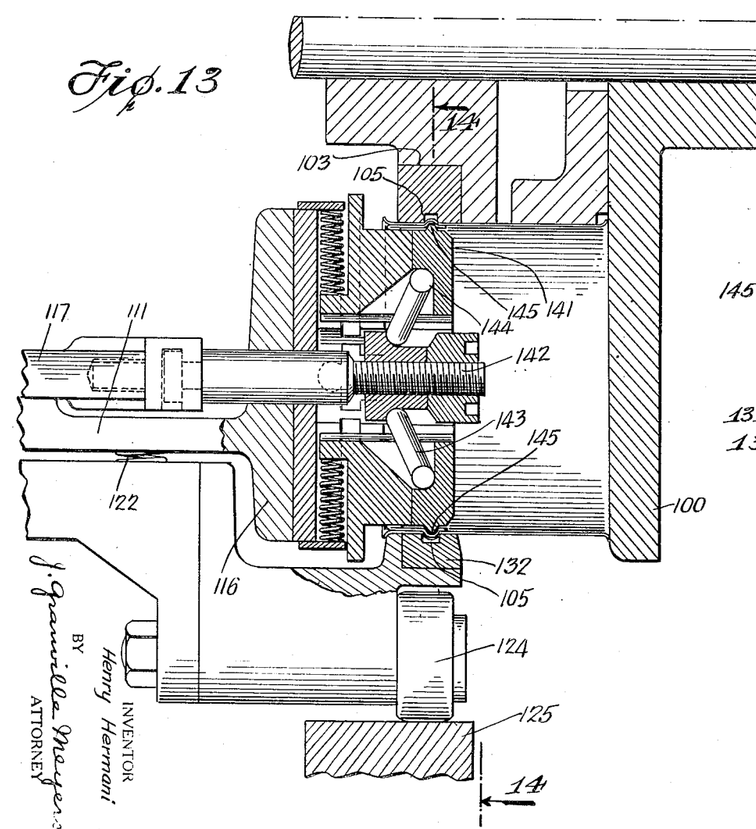
Fig. 13 is a fragmentary section in an axial plane of the beading mechanism in a position subsequent to that of Fig. 10.
Figure 14:
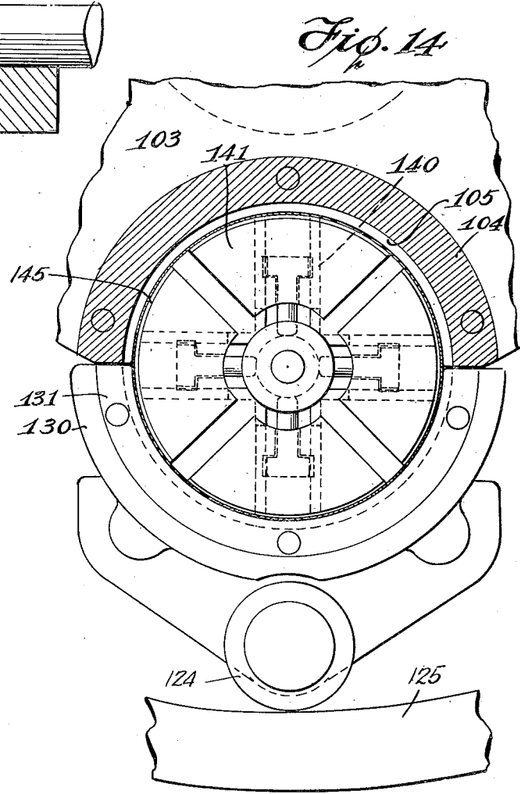
Fig. 14 is a section at 14—14, Fig. 13.

The collared cans are fed to the sockets 101 and 103 in a way which will be obvious from the preceding description of the inserting mechanism. That is, a collared body is dropped into the aligned sockets when they are in upper position, the corresponding slide 111 being at that time withdrawn to remove the clamp-and-die socket 130 from the path of the descending can, the die head 116 being also withdrawn for the same purpose. As the turret revolves in the direction indicated by the arrow, Fig. 1, the slide is advanced (to the right in Fig. 10) while the arm and the clamping member 130 are radially withdrawn to properly pass the flared can rim 6. The die head connected to the slide is advanced at the same time, the expansible die carriers being at this time in retracted position and so maintained by the proper relative contouring of cam channels 113 and 119 which cause bar 117 to advance at the same rate as the slide. Just before the parts reach the position of Fig. 10, that is, before the stated sockets reach right hand horizontal position to Fig. 1, the slide and die head have fully advanced, and just thereafter cam roller 124 engages a part of cam 125 which moves the roll and the clamping and die socket 130 inward to properly clamp and hold the can, and also to retain the outer die segments 131 in proper position for the die action in connection with the die channel formed in the inner socket. In the further rotation of the turret, comprising usually the movement from right hand horizontal position, Fig. 1, to lower position, below the shaft center, cam roller 118 is acted upon by its cam track 119 to advance bar 117 and connected toggle head 142 while the slide is retained in advanced position. The toggles are thus moved to approximately radial position, as shown in Fig. 13, and the die carriers are moved outward, bringing the male die formations 145 into contact with the collar near the inward edge thereof, and pressing the collar and body material outward into the female die formations 105 of the socket 103 and 132 of the clamping sockets to produce the interlocking bead formations D, D', above described. These beads are interrupted in the present specific die arrangement, by reason of the spaces between the ends of the male die formations 145. In the further rotation of the turret from lower position toward left hand horizontal position, Fig. 1, the dies are first retracted convergently by retraction of bar 117 while the slide 111 remains in advanced position; clamping socket 130 is retracted by the action of springs 122 as cam roll 124 passes onto a relieved surface of cam 125, and the die head and slide 111 are retracted simultaneously, clear of the can, by the action of their respective cam tracks 119 and 113.

The can, completed so far as present purposes are concerned, is then ready to roll out of its socket into a discharge chute 150, which may be substantially similar to the chute 73 described in connection with the inserting mechanism.

Figure 10:
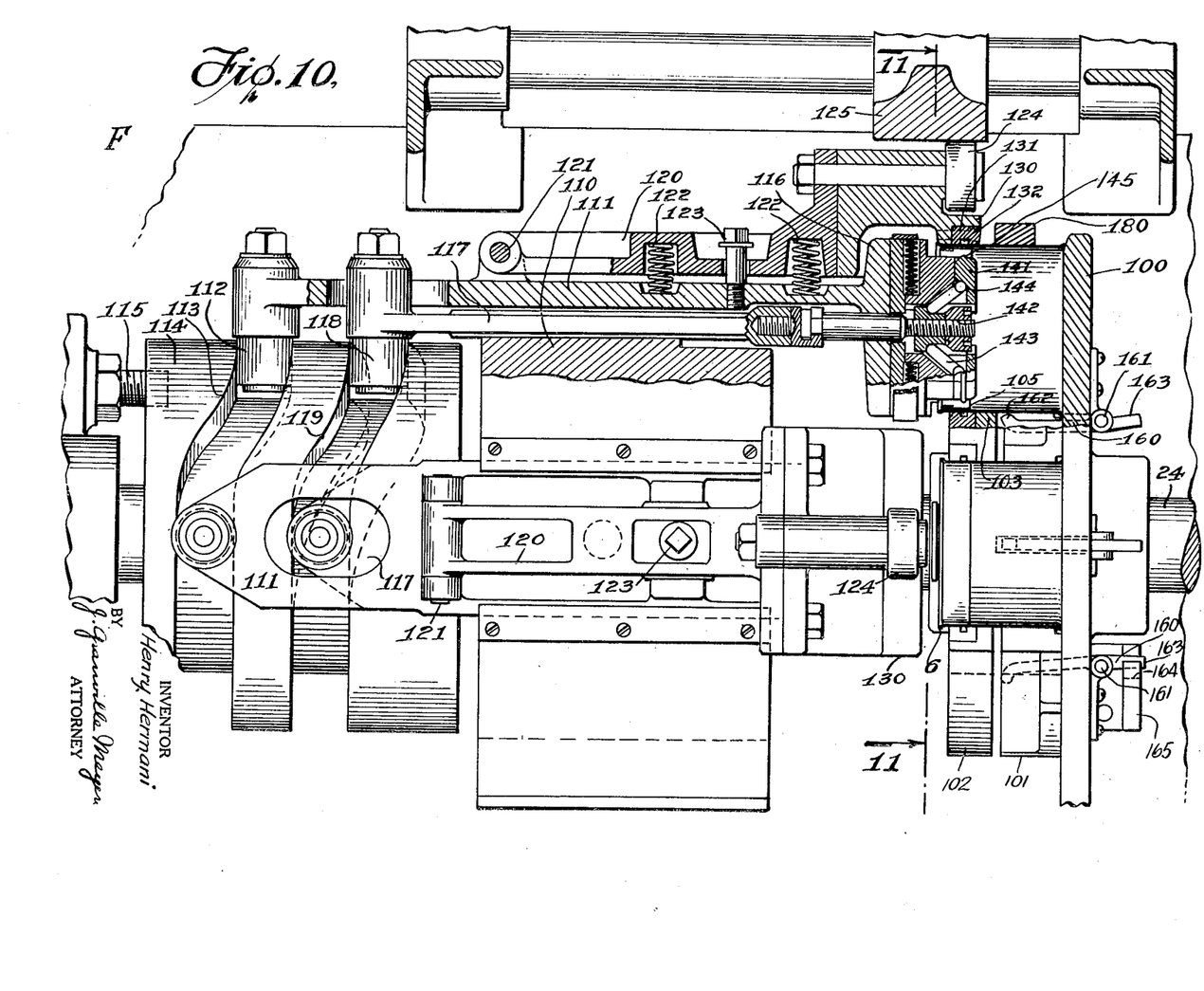
Fig. 10 is a section at 10—10, Fig. 1, enlarged, of principal parts of the fastening and beading mechanism F.

While in many cases the cans will be properly discharged from the sockets by gravity alone, it is desirable to absolutely insure against the accidental sticking of any can in its socket, by providing positive ejecting means. For this purpose disk 100, Fig. 10, is slotted to admit an ejector lever 160 at the bottom of each of the sockets. These levers are fulcrumed in lugs 161 secured to the disc, and each has a toe 162 arranged to engage the can body, and an outwardly projecting arm 163 to co-operate with a cam surface 164 (Fig. 1) formed in the edge of an upright plate 165 on the frame. The cam surface 164 is so arranged that as each can socket and ejecting lever moves upward from the bottom position, Fig. 1, the projecting ejector arm 163 strikes the cam surface and the toe 162 is advanced to positively push the can out of the socket toward the discharge chute 150. Before the socket reaches uppermost position, the lever arm 163 passes away from the cam and the lever is retracted by gravity.

As previously stated, similar ejector mechanism is desirably provided for the inserting mechanism, as sufficiently indicated in Fig. 1.

Although it is not necessary in all cases, a can guide or interrupted guard ring may be provided to aid in retaining the can bodies in the respective sockets of the inserting and fastening turrets respectively Thus Fig. 6 shows such a segmental guard ring 170 to co-operate with cans in holders 36 after they leave the upper position and until they approach the discharge position, and Fig. 10 shows a similar guard ring or sector 180 to co-operate with the cans in the holders of the fastening mechanism, in a similar way.

I claim:

1. A machine for inserting and securing short annular sheet-metal collars in cylindrical sheet-metal can bodies, comprising means for positioning a collar in axial alinement with an open end of a body, means then acting to move the collar axially and insert it within the body with the outward edges of the collar and body substantially in alinement, and means then acting to bead crease the inner margin of the collar and simultaneously crease the body wall to lock the collar in the body.

2. A machine for inserting and securing short annular sheet-metal collars in cylindrical sheet-metal can bodies, comprising means for automatically inserting the collars in successive bodies with outer collar and body edges substantially flush, means for gripping the successive bodies externally, and creasing means adapted to enter the successive bodies and produce complemental bead creases in the inward collar margins and body walls while the bodies are gripped to withstand the creasing pressure.

3. A machine for inserting and securing short annular sheet-metal collars in cylindrical sheet-metal can bodies, comprising means for positioning collars in axial alinement with the open ends of successive bodies, means for inserting the collars within the bodies, means for positioning the bodies with inserted collars in movable holders, and means acting while the successive bodies are secured in the holders to produce retaining bead creases in the inner collar margins and body walls.

4. A machine of the character described, comprising means for positioning successive tubular bodies and collars with a collar in approximate alinement and spaced relation to each body, means acting to insert the successive collars in their respective bodies, and means acting to produce interlocking beads in the collars and bodies and thus secure them together.

5. A machine of the character described, comprising means for positioning successive tubular bodies and collars with a collar in approximate alinement and spaced relation to each body, means acting during continuous advance to insert the successive collars in their respective bodies, and means acting during continuous advance of the collared bodies to secure the collars therein.

6. A machine of the character described, comprising means for positioning successive tubular bodies and collars with a collar in approximate alinement and spaced relation to each body, means acting during continuous advance to insert the successive collars in their respective bodies, and means acting during continuous advance of the collared bodies to complementally deform the material of the collars and bodies whereby they are secured together.

7. A machine of the characted described, comprising means for positioning successive tubular bodies and collars with a collar in approximate alinement and spaced relation to each body, means acting during continuous advance to insert the successive collars in their respective bodies, and means acting during continuous advance of the collared bodies to produce interlocking beads in the collars and bodies and thus secure them together.

8. A machine of the character described, comprising means for feeding tubular bodies and collars, rotary mechanism having holders for successive bodies and collars in alined relation, means acting during rotation of said mechanism to insert the collars in the respective bodies, other rotary mechanism having holders to which the collared bodies are delivered, and included in said mechanism means for clinching the collars in the successive bodies.

9. A machine of the character described, comprising means for feeding tubular bodies and collars, rotary mechanism having holders for successive bodies and collars in alined relation, means acting during rotation of said mechanism to insert the collars in the respective bodies, other rotary mechanism having holders to which the collared bodies are delivered, and included in said mechanism means for clinching the collars in the successive bodies by forming complemental bead creases therein.

10. A machine of the character described, comprising means for positioning successive tubular bodies and collars with a collar in approximate alinement and spaced relation to each body, means acting to insert the successive collars in their respective bodies, means acting to produce complemental bead creases to secure the collars therein, and means for then ejecting the bodies.

11. A machine of the character described, comprising means for feeding tubular bodies and collars, rotary mechanism having holders for successive bodies and collars in alined relation, means acting during rotation of said mechanism to insert the collars in the respective bodies, other rotary mechanism having holders to which the collared bodies are delivered, and included in said mechanism means for clinching the collars in the successive bodies, and means for then ejecting the bodies.

12. A machine of the character described, comprising mechanism for inserting collars in successive tubular bodies, mechanism for clinching the collars in the successive bodies, and a storage run between said mechanisms for conveying the collared bodies from the first to the second mechanism.

13. A machine of the character described, comprising mechanism for inserting collars in successive tubular bodies, mechanism for clinching the collars in the successive bodies, and a storage run between said mechanism for conveying the collared bodies from the first to the second mechanism, said storage run being of substantial length admitting the supply of successive collared bodies to the second mechanism in case of failure to the first mechanism to supply the collared bodies to the storage run.

14. A machine of the character described, comprising mechanism for inserting collars in successive tubular bodies, mechanism for clinching the collars in the successive bodies, a storage run between said mechanism for conveying the collared bodies from the first to the second mechanism, and said storage run comprising an elevating conveyor to elevate successive collared bodies for gravity feed to said second mechanism.

15. A machine of the character described, comprising mechanism for inserting collars in successive tubular bodies, mechanism for forming bead creases to secure the collars in the successive bodies, and means for driving said mechanisms concurrently.

16. A machine of the character described, comprising mechanism for inserting collars in successive tubular bodies, mechanism for clinching the collars in the successive bodies, and conveying means for transferring the collared bodies from the first to the second of said mechanisms, said means including means for elevating bodies to provide a gravity feed to said second mechanism.

17. A machine of the character described, comprising mechanism for inserting collars in successive tubular bodies, mechanism for clinching the collars in the successive bodies, conveying means for transferring the collared bodies from the first to the second of said mechanisms, said means including means for elevating bodies to provide a gravity feed to said second mechanism, and also providing for the movement of a substantial number of the collared bodies between said mechanisms.

18. A machine of the character described, comprising rotary mechanism for inserting collars in successive tubular bodies, and rotary mechanism for clinching the collars in the successive bodies.

19. A machine of the character described, comprising rotary mechanism for inserting collars in successive tubular bodies, rotary mechanism for clinching the collars in the successive bodies, and a storage run between said mechanism for conveying the collared bodies from the first to the second mechanism.

20. A machine of the character described, comprising rotary mechanism for inserting collars in successive tubular bodies, rotary mechanism for clinching the collars in the successive bodies, and a storage run between said mechanism for conveying the collared bodies from the first to the second mechanism, said storage run being of substantial length admitting the supply of successive collared bodies to the second mechanism in case of failure of the first mechanism to supply the collared bodies to the storage run.

21. A machine of the character described, comprising rotary mechanism for inserting collars in successive tubular bodies, rotary mechanism for clinching the collars in the successive bodies, and a storage run between said mechanism for conveying the collared bodies from the first to the second mechanism, said storage run comprising an elevating conveyor to elevate successive collar bodies for gravity feed to said second mechanism.

22. A machine of the character described, comprising rotary mechanism for inserting collars in successive tubular bodies, rotary mechanism for bead creasing the collars in the successive bodies, and means for driving said mechanisms concurrently.

23. A machine of the character described, comprising rotary mechanism for inserting collars in successive tubular bodies, rotary mechanism for clinching the collars in the successive bodies, and conveying means for transferring the collared bodies from the first to the second of said mechanisms, said means including means for elevating bodies to provide a gravity feed to said second mechanism.

24. A machine of the character described, comprising a turret having annularly spaced holders for tubular bodies and collars aligned therewith, means for feeding bodies and collars to the successive holders, the turret also including clamping socket members, collar plungers, and means acting in regular succession during continuous rotation of the turret to advance the clamping members, move them to engage the bodies, advance the plungers to insert the collars in the respective bodies, and retract the plungers and clamping members.

25. A machine of the character described, comprising a turret having annularly spaced holders for tubular bodies and collars alined therewith, means for feeding bodies and collars to the successive holders, the turret also including clamping socket members, collar plungers, and means acting in regular succession during continuous rotation of the turret to advance the clamping members, move them to engage the bodies, advance the plungers to insert the collars in the respective bodies, and retract the plungers and clamping members, and mechanism arranged to receive the collared bodies and including means for clinching the collars therein.

26. A machine of the character described, comprising a turret having annularly spaced holders for tubular bodies and collars alined therewith, means for feeding bodies and collars to the successive holders, the turret also including clamping socket members, collar plungers, means acting in regular succession during continuous rotation of the turret to advance the clamping members, move them to engage the bodies, advance the plungers to insert the collars in the respective bodies, and retract the plungers and clamping members, and means for positively discharging the bodies.

27. Mechanism for handling tubular bodies, comprising a turret having annularly spaced sockets and including for each socket a slide having a clamping member, means for moving the clamping member to and from clamping position, a plunger arranged to act upon a collar, and means for reciprocating the plunger.

28. Mechanism for handling tubular bodies, comprising a turret having annularly spaced sockets and including for each socket a slide having a clamping member, means for moving the clamping member to and from clamping position, a plunger arranged to act upon a collar, means for reciprocating the plunger, and means for supplying the tubular bodies to the sockets when the corresponding slides and plungers are retracted.

29. Mechanism for handling tubular bodies, comprising a turret having annularly spaced sockets and including for each socket a slide having a clamping member, means for moving the clamping member to and from clamping position, a plunger arranged to act upon a collar, means for reciprocating the plunger, and a chute arranged to deliver successive tubular bodies to the sockets when the latter are in upward position and the corresponding slide and plunger are retracted.

30. Mechanism for handling tubular bodies, comprising a turret having annularly spaced sockets and including for each socket a slide having a clamping member, means for moving the clamping member to and from clamping position, a plunger arranged to act upon a collar, means for reciprocating the plunger, an ejector for each socket, and means for operating the ejector.

31. Mechanism for operating upon tubular can bodies having inserted annular sheet-metal collars, comprising a holder, means for supplying a collared body such as described to the holder, a creaser axially alined with the holder and the body therein, means for moving the creaser within the body, and means for then operating the creaser to produce complemental bead creases in the can wall and inner margin of the collar.

32. Mechanism for operating upon tubular can bodies having inserted annular sheet-metal collars, comprising holders arranged in a series and means for moving them circuitously, means for supplying collared bodies as described to the successive holders, creasers alined with the holders, means for advancing the creasers within the bodies carried by the respective holders, and means for thereafter operating the creasers to produce complemental bead creases in the body walls and inner margins of the collars.

33. Mechanism for operating upon tubular can bodies having inserted annular sheet-metal collars, comprising holders arranged in a series and means for moving them circuitously, means for supplying collared bodies as described to the successive holders, creasers alined with the holders, means for advancing the creasers within the bodies carried by the respective holders, means for thereafter operating the creasers to produce complemental bead creases in the body walls and inner margins of the collars, means for thereafter withdrawing the creasers, and means for discharging the bodies from the holders.

Signed at Baltimore, in the city of Baltimore, and State of Maryland this 24 day of May A. D. 1926.

HENRY HERMANI.

DISCLAIMER 1,620,205. *Henry Hermani*, Baltimore, Md. SHEET-METAL ASSEMBLING AND WORKING MACHINE. Patent dated March 8, 1927. Disclaimer filed December 28, 1929, by the patentee and the assignee, *The Tin Decorating Company of Baltimore*.

Therefore enter this disclaimer, to-wit:

I. To the combination defined in claim 1, and particularly to the last element of said claim—namely, "and means then acting to bead crease the inner margin of the collar and simultaneously crease the body-wall to lock the collar to the body," except where such means "travels in a circuitous path during operation."

II. To the combination defined in claim 3, and particularly to that part thereof which reads, "and means acting while the successive bodies are secured in the holders to produce retaining bead creases in the inner collar margins and body-walls," except where such bead creasing means "travels in a circuitous path during operation."

III. To the combination defined in claim 4, and particularly that part thereof which reads, "and means acting to produce interlocking beads in the collars and bodies and thus secure them together," except where said means "travels in a circuitous path during operation."

IV. To the combination defined in claim 8, and particularly that portion thereof which reads, "other rotary mechanism having holders to which the collared bodies are delivered, and included in said mechanism means for clinching the collars in the successive bodies," except where such rotary mechanism "travels in a circuitous path during operation."

V. To the combination defined in claim 12 and particularly to that part thereof which reads, "mechanism for clinching the collars in the successive bodies," except where such mechanism "travels in a circuitous path during operation."

VI. To the combination defined in claim 13 and particularly that part thereof which reads, "mechanism for clinching the collars in the successive bodies," except where such mechanism "travels in a circuitous path during operation."

VII. To the combination defined in claim 14, and particularly that part thereof which reads, "mechanism for clinching the collars in the successive bodies," except where such mechanism "travels in a circuitous path during operation."

VIII. To the combination defined in claim 15, and particularly that part thereof which reads, "mechanism for forming bead creases to secure the collars in the successive bodies," except where such mechanism "travels in a circuitous path during operation."

IX. To the combination defined in claim 16, and particularly that part thereof which reads, "mechanism for clinching collars in the successive bodies," except where such mechanism "travels in a circuitous path during operation."

X. To the combination defined in claim 17, and particularly that part thereof which reads, "mechanism for clinching collars in the successive bodies," except where such mechanism "travels in a circuitous path during operation."

[*Official Gazette January 14, 1930.*]